Aug. 12, 1969   G. L. MATHE ET AL   3,460,418
CLEANER DEVICE FOR CLEANING RESIDUE FROM THE CUTTING
EDGE OF A ROTARY DISC TYPE CUTTER
Filed Sept. 5, 1967    2 Sheets-Sheet 1
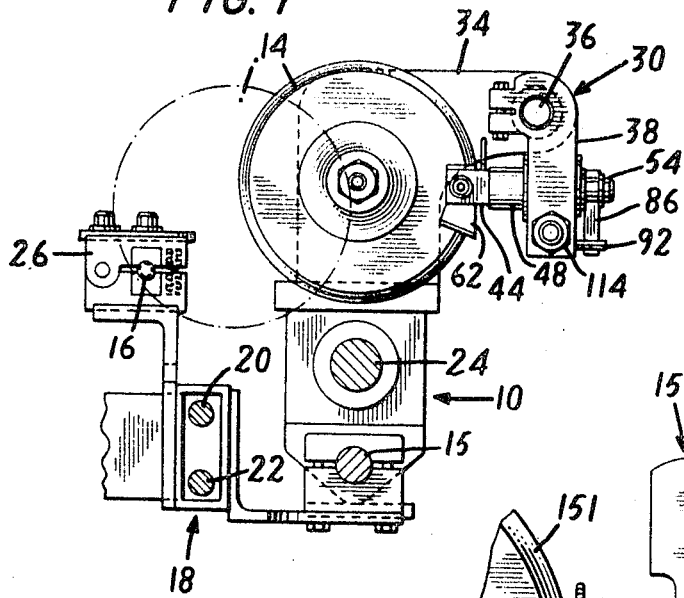
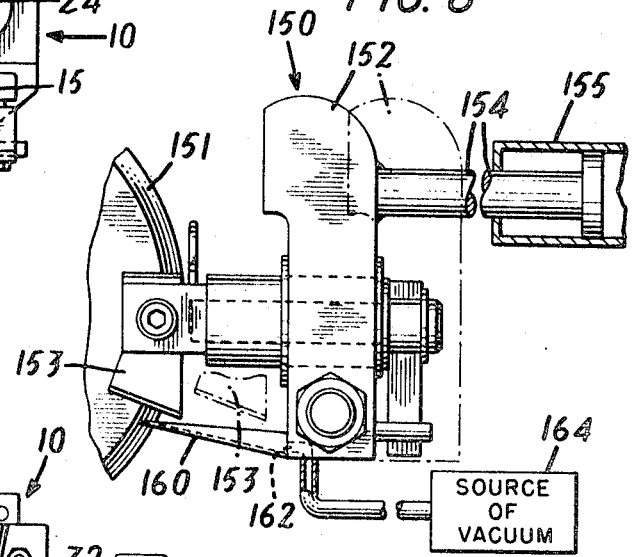
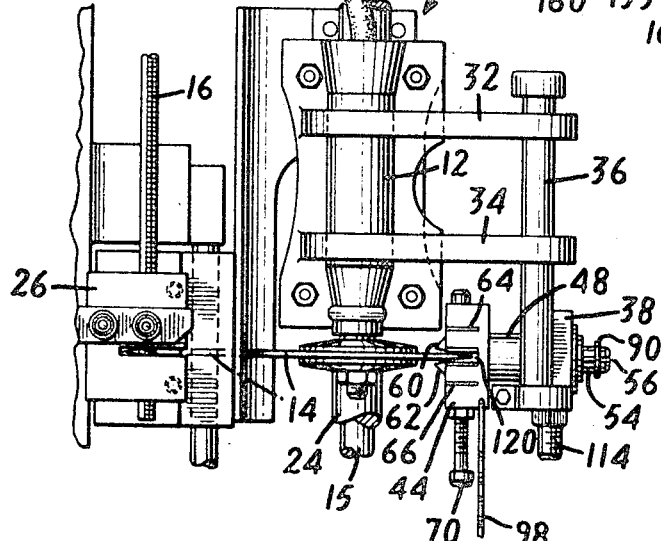

Aug. 12, 1969     G. L. MATHE ET AL     3,460,418
CLEANER DEVICE FOR CLEANING RESIDUE FROM THE CUTTING
EDGE OF A ROTARY DISC TYPE CUTTER
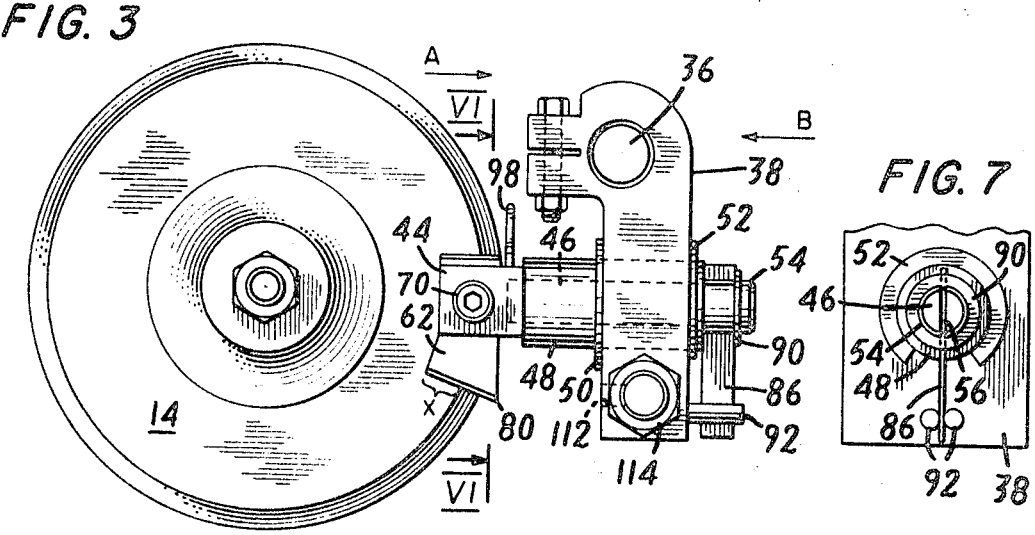
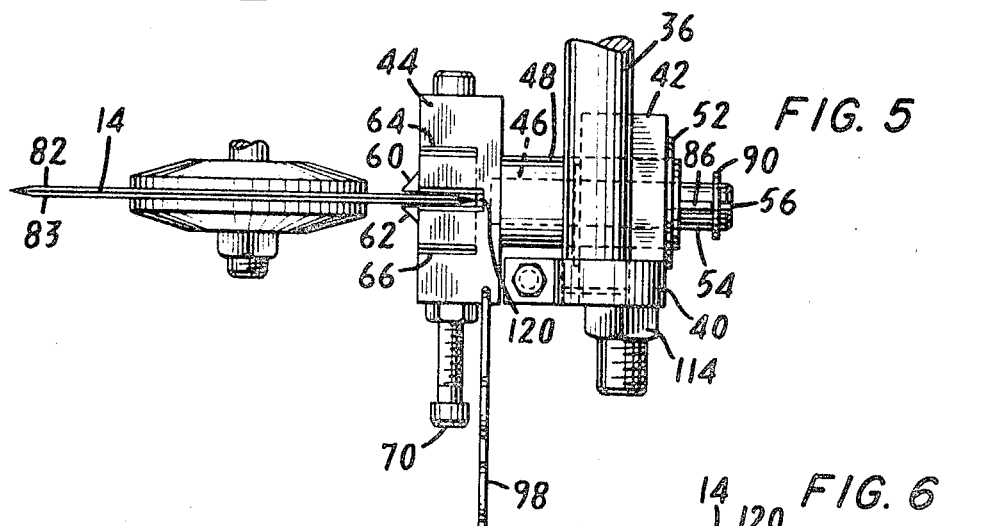
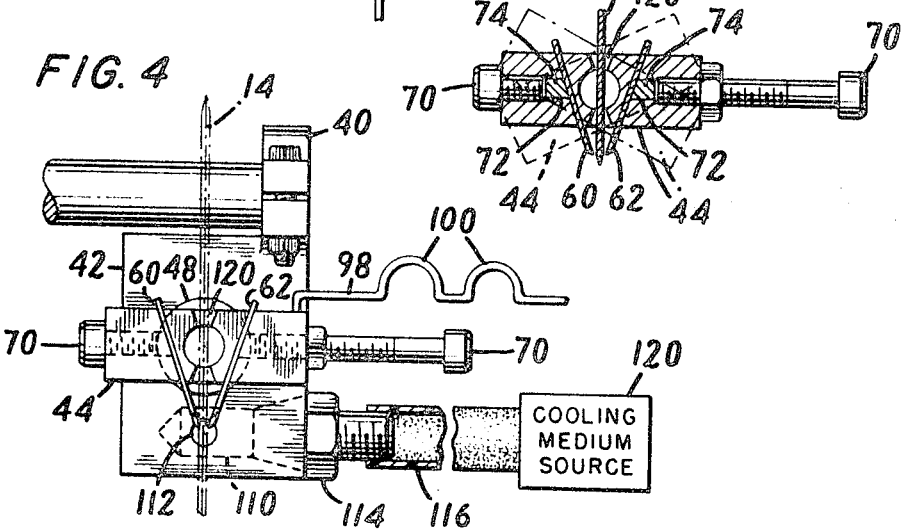

United States Patent Office 3,460,418
Patented Aug. 12, 1969

3,460,418
CLEANER DEVICE FOR CLEANING RESIDUE FROM THE CUTTING EDGE OF A ROTARY DISC TYPE CUTTER
George L. Mathe and Floyd G. Boothe, Jr., Richmond, Va., assignors to Philip Morris Incorporated, New York, N.Y., a corporation of Virginia
Filed Sept. 5, 1967, Ser. No. 665,584
Int. Cl. B26d 7/08
U.S. Cl. 83—168
13 Claims

ABSTRACT OF THE DISCLOSURE

A cleaner device for cleaning residue from surfaces adjacent the cutting edge of a rotary disc cutter wherein a pair of cleaner blades are carried on a mounting block supported adjacent the cutting edge of the disc cutter, the cleaner blades being carried in a blade holder which is rotatably mounted in the mounting block with the cleaner blades extending alongside opposite faces of the disc cutter. Each of the cleaner blades has a dressing edge thereon with the dressing edges normally being held out of contact with corresponding faces of the disc cutter. When the blade holder is rotated in either of two opposite directions, the dressing edges of the cleaner blades are moved into contact with the corresponding faces of the disc cutter along the surfaces thereof adjacent the cutting edge and remove any buildup of residue adhering thereto consequent from the cutting operation. The device includes a biasing member which normally maintains the dressing edges out of contact with the disc cutter faces and which functions to return same to a non-cleaning position after release of the rotative force applied to the blade holder for effecting cleaning.

Background of the invention

It is known that in the course of certain cutting operations involving the use of a rotary disc type cutter, a residue of material from the article being cut can build up on the side faces of the cutter adjacent the cutting edge. As a consequence of buildup, it is difficult to obtain a straight smooth cut of the article material. Moreover, the residue may in the instance of certain materials soil the article being cut rendering it unfit for its intended purpose. As for example, in the manufacture of cigarettes and cigarette filters, any residue present on the disc cutter can soil the cigarette wrapper or the filter structure rendering them unsuitable for use in cigarettes. Materials which can cause buildup include adhesives, plastics which may form part of a filter-mouthpiece, filter material, tobacco or paper. In recognition of this problem, especially as it exists in the tobacco industry, various devices and procedures have been developed for cleaning disc cutters or for preventing the buildup of article residue thereon. For example, hand manipulated scrappers have been applied against the side faces of the disc cutter while it is rotating in an effort to clean same. However, this operation is hazardous to the operator since the guard in front of the disc cutter generally has to be removed to provide access for cleaning. Moreover, it provides a non-uniform type cleaning action and it can result in damage to the cutting edge of the disc cutter if the operator improperly applies the scrapper to the cutting edge. It is also known that fabric or felt pads can be used as wiper devices for the disc cutters but they have not proven fully satisfactory because they do not function to remove a hardened accumulation of residue. It is also known to employ a nonstick fluid which is applied to the disc cutter faces. However, this latter expedient frequently results in a spattering or throw off of fluid due to centrifugal force onto the article being cut and frequently discolors same. This is particularly objectionable when sectioning a continuous article such as a wrapped cigarette filter assembly or mouthpiece assembly into section suitable for cigarette packaging machines, since in discoloring the filter material or mouthpiece structure, it renders them unsatisfactory for incorporation in cigarettes. It is also known to coat the faces of the disc cutter adjacent the cutting edge with Teflon in an effort to inhibit residue buildup. However, this procedure while initially effective to that end has the shortcoming that the Teflon coating soon wears off.

Summary of the invention

The present invention is concerned with a device which can be utilized for cleaning residue from the side faces of a rotary disc type cutter along the face surfaces immediately adjacent the disc cutter cutting edge. It is described in particular embodiments herein as it is used in connection with apparatus for sectioning a continuous length of cigarette filter rod. However, it will be understood that it has a wider applicability of use in conjunction with the cutting of rod-like articles of any material or combination of materials and/or cross-sectional shape. In general, the cleaner device comprises a mounting block which is supported axially spaced outwardly of the rotary disc cutter cutting edge and which carries a blade holder, the blade holder extending radially inwardly from the mounting block and being rotatably supported therein for rotation about an axis perpendicular to the axis of rotation of the cutter disc. The blade holder carries a pair of flat, flexible cleaner blades which are supported in slots formed in the blade holder and held securely therein by means of set screws. The cleaner blades extend outwardly of the blade holder and along opposite sides of the cutter disc, the arrangement being such that dressing edges on the cleaner blades extend from beyond the cutting edge radially a distance inwardly of the cutting edge in juxtaposition with the side face surfaces adjacent the cutting edge. By rotating the blade holder in each of two opposite directions, first one and then the other of the cleaner blades can be so positioned that its dressing edge contacts a corresponding face of the disc cutter along the surface thereof which is adjacent the cutting edge. The measure of contact required is only that sufficient to be move any hardened residue of material accumulated thereon and is of such slight duration that little, if any, heating of the disc cutter material or harmful effect to the cutting edge occurs. Normally, the blade holder is positioned in a neutral position, that is to say, the dressing edges of the cleaner blades are maintained out of contact with the side faces of the cutter disc, the blade holder being maintained or restrained in that position by means of a spring member connected therewith. The spring member preferably is a blade spring and is located at a side of the mounting block remote from the disc cutter cutting edge. When the blade holder is rotated to move one or the other of the cleaner blades into contact with a corresponding face of the disc cutter, the blade spring flexes so that as soon as the rotative force applied to the blade holder is released the blade holder will return to a neutral position in which the dressing edges of the cleaning blades are out of contact with the respective disc cutter faces. The rotative force may be applied to the blade holder either manually with a handle connected thereto for that purpose or with a powered device the operation of which is controlled by suitable controller device.

According to the invention, the mounting block may be provided with a passage extending therein which at one end terminates in an opening formed in the surface of the mounting block, the opening being juxtaposed with the dressing edges of the cleaner blades. The other end of the passage extends to a side surface of the mounting block at which is connected a conduit connecting the passage with a source of a cooling medium. In this manner, cooling medium can be directed onto the disc cutter side faces during the cleaning operation.

The invention accordingly comprises the features of construction, combination of elements, and arrangement of parts, which will be exemplified in the construction hereinafter set forth and the scope of the invention will be indicated in the claims.

Brief description of the drawings

A fuller understanding of the nature and objects of the invention will be had from the following detailed description taken in conjunction with the accompanying drawings in which:

FIGURE 1 is an end elevational view of a portion of a rotary cutter apparatus on which the cleaning device of the present invention can be used.

FIGURE 2 is a top plan view of FIGURE 1.

FIGURE 3 is an end elevation of the cleaner device on an enlarged scale.

FIGURE 4 is a front elevational view of the device as viewed in the direction of arrow A in FIGURE 3.

FIGURE 5 is a top plan view of the device shown in FIGURE 3.

FIGURE 6 is a sectional view as taken along the line VI—VI in FIGURE 3.

FIGURE 7 is a fragmentary rear elevational view of the device as taken in the direction of arrow B in FIGURE 3.

FIGURE 8 is a view similar to FIGURE 3 of an embodiment of the cleaner device which is mounted on an air cylinder unit, the stroking of which moves the cleaner device toward and away from the disc cutter between cleaning and non-cleaning locations.

Throughout the description like reference numerals are used to denote like parts in the drawings.

Description of the preferred embodiments

The cleaner device of the present invention is described herein in a representative embodiment as employed for cleaning the disc cutter of a continuous rod cutter apparatus used for sectioning a continuous length of cigarette filter rod. The continuous rod cutter apparatus is generally of the type described in the presently pending patent application of G. L. Mathe et al. entitled "Continuous Rod Cutter," Ser. No. 540,691 filed Apr. 6, 1966. The latter mentioned continuous rod cutter is used to cut sections of a continuous filter rod into sections of eight filter units length for subsequent use in cigarette manufacturing machinery. A portion of the rod cutter of said patent application is shown in FIGURES 1 and 2 and includes an oscillating frame assembly 10 on which is mounted a drive motor 12 for rotating disc cutter 14 at high speed, the axis of rotation of the disc cutter being parallel with that along which the continuous article 16 advances. The oscillating frame assembly 10 is provided with a bracket structure shown generally at 18 which is supported on a pair of shafts 20 and 22 thereby adapting the assembly 10 for reciprocating travel along a course parallel to the advance of the article 16, the stroking of the assembly being effected by a reciprocating shaft 24 connected therewith and operated by drive means which are not shown. Concurrent with the reciprocating movement of the assembly 10 it is oscillated about shaft 15 to move the disc cutter into and out of cutting contact with article 16 by means not shown, the extremes of the oscillating movement being shown in solid and in long and short dashed lines respectively. The said rod cutter also includes a clamping ledger 26 which clamps the article 16 during the actual cutting thereof. The ledger 26 as well as the assembly 10 reciprocates one cycle each time the article advances a predetermined length corresponding to the length of the section being cut therefrom, and also is oscillated one cycle.

The rod cutter of said application is readily adaptable for incorporating the cleaner device of the present invention therein. Thus the cleaner device 30 can be mounted on a pair of support brackets 32 and 34 enclosing the casing of the drive motor 12, the latter providing structure for receiving a rod 36 at the end of which is connected the cleaner device 30.

Turning now to a more detailed description of the cleaner device 30, the rod 36 on which same is carried extends substantially parallel with the axis about which the rotary disc cutter 14 rotates. Physically connected to the end of the rod 36 and located spaced radially outwardly from the cutting edge of the disc cutter 14, is upright mounting block 38, the mounting block having an apertured top part 40 which receives the rod 36 and a bottom enlarged part 42. The mounting block 38 serves as the structure on which is carried the blade holder 44. The blade holder 44 as will be best noted in FIGURES 4 and 5, has an elongated body, the major axis of which is arranged parallel with the axis about which the disc cutter rotates, the blade holder 44 being fixed to a shaft 46 which in turn extends through a sleeve 48 passing through a suitable bore opening provided in the mounting block 38. The axis of the shaft 46 thus extends perpendicular to the axis about which the rotary disc cutter 14 rotates. As seen best in FIGURE 3, the sleeve 48 is retained in the mounting block by means of front and rear keeper rings 50 and 52. Shaft 46 is provided with a terminal portion 54 that extends radially beyond the rear face of the mounting block (the mounting block face surface remote from the disc cutter cutting edge), the terminal portions being slotted in an axial direction as at 56. The purpose of providing shaft 48 with slot 56 will become more apparent later in the description. The blade holder 44 serves as the structure in which supported is a pair of cleaner blades 60 and 62 and to that end the blade holder is provided with a pair of slots 64 and 66, for receiving the respective cleaner blades, the slots being formed blind inwardly from the front face of the blade holder and being inclined angularly of the plane in which the cutter disc rotates as best seen in FIGURE 4. The blade holder 44 also is provided with a disc entry slot 120 which extends therein in a plane coincident with the plane in which the cutter disc rotates and which receives a peripheral portion of the cutter disc in the course of its rotative movement. The slots 64 and 66 are located symmetrically on either side of disc entry slot 120.

The cleaner blades are preferably made of a flexible high speed steel having a thickness in a range between 10 to 15 thousandths of an inch and preferably 13 to 15 thousandths of an inch. The cleaner blades are removably retained in the blade holder by means of the set screw-plug arrangement, shown in FIGURE 6. Thus, set screws 70 are provided for each cleaner blade and extend into the blade holder 44 in the direction of the major axis thereof and from opposite ends. Concentric with the threaded portions in which is received the set screws 70 are bore openings 72 formed in the blade holder which openings communicate with the slots 64 and 66. Slidable in the bore openings 72 are plugs 74 which have chamfered or inclined inner ends adapted to engage the cleaner blades. By suitably rotating the set screws, the plugs are axially displaced and apply a bearing force against the blades securely retaining them in the blade holder.

As seen in FIGURES 3 and 6, the cleaner blades extend downwardly from the blade holder so that the lower or dressing edges 80 of each blade confronts portions of the surface of the respective side faces 82, 83 of the disc cutter which are adjacent the cutting edge of the disc cutter and on which surfaces occurs the buildup of residue, the approximate extent of the surface being denoted at X in FIGURE 3. As will be noted, the cleaner blades are normally spaced from the face surfaces X and the dressing edges extend radially inwardly some distance of the tip of the cutting edge as well as a short distance radially outwardly therefrom. Normally, the dressing edges 80 of the cleaner blades are maintained in a neutral position out of contact with the side faces of the disc cutter, the dressing edges being symmetrically arranged about the plane in which the cutter disc rotates. This maintenance of the dressing edges in a neutral position as shown in solid lines in FIGURE 6 is effected by means of a blade spring arrangement which will now be described. Located behind the mounting block 40 is blade spring 86 of generally flat shape, the upper end of which locates in the axial slot 56 of shaft 46, the blade spring being retained by means of a keeper ring 90. The other end of the blade spring 86 extends downwardly from shaft 46 and is positioned between a pair of dowel pins 92 extending rearwardly of the mounting block. The action of the blade spring is such that when the blade holder 44 is rotated about an axis perpendicular to the axis of rotation of the cutter disc 14 so as to bring the dressing edges 80 of the cleaner blades into a cleaning position wherein they contact the cutting side face surface X, the blade spring 86 will distort or flex so that as soon as the rotative force is released from the blade holder, the blade spring 86 will resume its flat condition returning the blade holder to a neutral position in which the dressing edges of the cleaner blades will be spaced a distance from the side faces of the disc cutter as shown in FIGURES 4 and 6.

For the purpose of rotating the blade holder to alternately bring the dressing edges 80 of the cleaner blades 60, 62 into contact with the faces of the disc cutter cutting edge, the blade holder 44 is provided with a handle 98 which as will be noted in FIGURE 4, extends longitudinally away from the one end of the blade holder and is provided with one or more finger receiving loops 100. Thus the operator can manipulate the blade holder to bring the cleaner blades into contact with the disc cutter by applying a rotative force to the blade holder with the handle 98 to first rotate the blade holder in one direction and then rotate the blade holder in an opposite direction, the two extremes of this rotative movement being shown in short dashed lines and long and short dashed lines in FIGURE 6. When the rotative force applied by the operator is released the blade spring will return the blade holder to a neutral position. It is also possible to employ automatic devices for rotating the blade holder. As for example, an air cylinder may be connected to the blade holder or even to shaft 46 and be automatically operated by means of a suitable control such as an electric motor driven cam controlled by a timer unit to first rotate the blade holder in one direction for a predetermined time and then rotate it in an opposite direction for a like period. In cleaning the disc cutter, the cleaner blades because of their relatively small thickness flexingly conform with the contour of the respective disc cutter face portions X to give a clean, positive scraping operation. This is true even through the disc cutter may also flex to a lesser degree when the cleaner blades are moved into contact therewith. The angle which slots 64, 66 make with the plane of rotation of the disc cutter is preferably about 20° and the dressing edges are so formed that they preferably diverge away from said plane from front to rear at an angle of about 7.5°.

In the operation of the cleaner device, the alternate engagement of the dressing edges of the cleaner blades with the faces X of the disc cutter is very brief so that in most instances there is not sufficient generation of heat so as to have a harmful effect on the material of the cutting edge. However, if it is desired to provide cooling of the disc cutter periphery during the time of cleaning, or to apply a cooling medium to the disc cutter to dissipate the heat generated in the course of sectioning the continuous article, the cleaning device of the present invention is adapted to be employed for directing a flow of a cooling medium onto the disc cutter periphery. To that end, the lower part of the mounting block 38 is provided with an internal passage 110 which terminates at one end in an opening 112 confronting the dressing edges of the cleaner blades and the cutting edge, the other end of the passage extending to one side of the block to which is connected a fitting 114. The fitting 114 serves to receive a flexible conduit 116 with which the passage can be placed in communication with a source 120 of cooling medium. Since the opening 112 is juxtaposed with the dressing edges of the cleaning blades, any cooling medium flowing therefrom also will be directed onto the rotary disc cutter periphery.

As will be noted from FIGURES 1 and 2, the cleaner device 30 is designed to follow the movement of the assembly 10, that is to say, it reciprocates and oscillates in the same manner as the assembly since it is fixed thereto. In this manner there is no relative movement between the rotary disc cutter and the cleaning device so that it can be employed at any point in the cutting cycle for cleaning the disc cutter. It will also be apparent from the reading of this description, that the cleaner device can be utilized with the device maintained in a fixed position and the rotary cutter operating such that the axis of rotation of the disc cutter moves to follow the article movement and to move the disc cutter into and out of cutting contact with the article. In this instance, the cleaner would be designed to operate when the rotary disc cutter is in a "rest" position with operation of the cleaner device being controlled automatically and synchronized to follow the arrival of the cutter disc in the "rest" position.

The embodiment 150 of the cleaner device shown in FIGURE 8 is intended to be utilized for cleaning operations involving a rotary cutter disc 151 which operates in a fixed position, rotating about a fixed axis. As in the previously described embodiments, the cleaning device 150 is provided with a mounting block 152 which carries the cleaner blades 153, the latter being rotatable for alternately bringing them into cleaning contact with the disc cutter. The cleaning device, however, also is adapted to be physically moved toward the disc cutter for cleaning same, being mounted for movement between the operative cleaning location shown in solid lines and the non-cleaning location shown in dashed lines during the cleaning operation. For that purpose, the mounting block 152 is fixed to the piston 154 of an air cylinder unit 155, the piston being stroked to move the mounting block and hence the cleaner blades 153 between cleaning and non-cleaning locations. The device is otherwise the same as that previously described.

A further feature of the invention which is illustrated in the embodiment shown in FIGURE 8 is the use of a vacuum cleaning arrangement for gathering the scrapings removed from the disc cutter by the cleaner blades during the cleaning operation. For that purpose, the front face of the mounting block 152 may be provided with a trough-like scoop 160 which can be slotted to receive the peripheral part of a rotating disc cutter with the interior of the scoop 160 communicating with a passage 162 formed in the mounting block and connected with a source of vacuum 164 in the manner shown. Thus as the cleaning device is operated to remove residue from the portions of the cutter disc adjacent the cutting edge, the particles are drawn into the vacuum system. It is contemplated that the vacuum cleaning device would be used whenever a cooling arrangement such as that shown in FIGURE 4 is not employed with the cleaning device.

It is believed that the operation of the cleaning device of the present invention will be apparent from the description already given and that it is not necessary to further elaborate on said operating procedure.

From the foregoing description, those skilled in the art will appreciate that the cleaner device of the present invention is useful for cleaning rotary cutter discs on various types of cutting apparatus and that the cleaning operation is effective to remove all buildup or accrued residue formed on the disc cutter side face portions adjacent the cutting edge without causing any damage to the cutting edge surface.

It will thus be seen that the objects set forth above, among those made apparent from the preceding description, are efficiently attained and since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. A device for cleaning the side face surfaces adjacent the cutting edge of a rotary disc cutter comprising
a mounting block supported spaced radially outwardly from the cutting edge of said disc cutter,
a blade holder connected with said mounting block and extending inwardly therefrom in the direction of said disc cutter,
a pair of generally flat, flexible cleaner blades carried on said blade holder and extending therefrom along opposite side faces of said disc cutter, each of said cleaner blades having a dressing edge spacedly confronting a portion of the surface of a corresponding face adjacent the cutting edge of said disc cutter, said blade holder being rotatable on said mounting block about an axis perpendicular to the axis about which said disc cutter rotates whereby rotation of said blade holder in each of two opposite directions moves the dressing eges of the respective cleaner blades into cleaning position wherein they contact the corresponding faces of said disc cutter.

2. The device of claim 1 wherein the pair of cleaner blades extend angularly of the plane in which said disc cutter rotates, the blade holder having correspondingly angularly arranged slots for receiving said cleaner blades.

3. The device of claim 2 wherein the blade holder is provided with a disc entry slot extending therein in a plane coincident with the plane in which said disc cutter rotates, a peripheral portion of said disc cutter extending into said entry slot in the course of its rotative movement.

4. The device of claim 3 wherein the angularly arranged slots in which the cleaner blades are received are arranged symmetrically on either side of said disc entry slot.

5. The device of claim 4 wherein the blade holder is an elongated body the major axis of which extends substantially parallel to the axis about which said disc cutter rotates, said elongated body embodying means for removably retaining said pair of cleaner blades therein.

6. The device of claim 5 wherein the means for removably retaining said pair of cleaner blades in said body comprises set screws threadedly extending into said body at opposite ends thereof, said body having passages extending therein in the direction of the major axis thereof and communicating with said angularly arranged slots, and plugs slidable in said passages and engageable with said set screws, the latter when rotated moving said plugs into bearing contact against said cleaner blades for retaining same in said body.

7. The device of claim 1 further comprising means connected with said blade holder for rotating same about said axis perpendicular to the axis of rotation of said disc cutter.

8. The device of claim 7 wherein the means for rotating said blade holder comprises a handle connected therewith.

9. The device of claim 1 further comprising means for applying a restraining force to said blade holder effective to normally prevent rotation of same and maintain the dressing edges of said cleaner blades in a non-cleaning position.

10. The device of claim 9 wherein said blade holder includes a shaft extending radially away from the cutting edge of said cutter disc, said mounting block having a sleeve receiving said shaft, said shaft being rotatable in said sleeve and having a terminal section extending radially outwardly of said mounting block, said terminal section having an axially directed slot therein.

11. The device of claim 10 wherein the means for restraining said blade holder comprises a normally flat blade spring extending at one end in the slot in the terminal section of said shaft, said mounting block having a pair of pins extending outwardly therefrom parallel to said shaft, the other end of said blade spring locating between said pins, said blade spring yieldably flexing when said blade holder rotates under the effect of a rotative force applied thereto, the flexure of said blade spring being effective to rotate said blade holder sufficiently to return the dressing edges of said cleaner blades to a non-cleaning position when said rotative force is released.

12. The device of claim 1 wherein said mounting block is provided with an elongated inner passage having one end thereof terminating at an opening formed in a surface of said mounting block, the other end of said passage being connected with a source of a cooling medium, said opening being juxtaposed with the dressing edges of said cleaner blades and the cutting edge of said disc cutter providing that the cooling medium can be directed onto said dressing edges and said cutting edge.

13. The device of claim 1 wherein said mounting block is provided with an elongated inner passage having one end thereof terminating at an opening formed in a surface thereof confronting said disc cutter, a scoop connected with said surface and enclosing a space communicting with said opening, said scoop having a slotted body for receiving a portion of said disc cutter in the course of its rotative movement, and a source of vacuum connected with said passage.

References Cited

UNITED STATES PATENTS

| 2,163,687 | 6/1939 | Jacobsen | 83—168 X |
| 2,949,801 | 8/1960 | Mills | 83—168 |

FOREIGN PATENTS

| 367,239 | 2/1932 | Great Britain. |
| 579,879 | 8/1946 | Great Britain. |

WILLIAM S. LAWSON, Primary Examiner